(12) United States Patent
Bao et al.

(10) Patent No.: US 9,384,165 B1
(45) Date of Patent: Jul. 5, 2016

(54) CONFIGURING ROUTING IN MESH NETWORKS

(75) Inventors: Liewei Bao, Westford, MA (US); Ian Rudolf Bratt, Castle Rock, CO (US)

(73) Assignee: Tilera Corporation, Westborough, MA (US)

( * ) Notice: Subject to any disclaimer, the term of this patent is extended or adjusted under 35 U.S.C. 154(b) by 24 days.

(21) Appl. No.: 13/278,676

(22) Filed: Oct. 21, 2011

Related U.S. Application Data

(63) Continuation of application No. 12/169,442, filed on Jul. 8, 2008, now Pat. No. 8,045,546.

(51) Int. Cl.
*G06F 13/14* (2006.01)
*G06F 15/78* (2006.01)

(52) U.S. Cl.
CPC .................................. *G06F 15/7867* (2013.01)

(58) Field of Classification Search
CPC combination set(s) only.
See application file for complete search history.

(56) References Cited

U.S. PATENT DOCUMENTS

| | | | |
|---|---|---|---|
| 4,441,162 A | | 4/1984 | Lillie |
| 4,484,292 A | * | 11/1984 | Hong et al. .................... 716/129 |
| 4,933,933 A | | 6/1990 | Dally et al. |
| 5,533,198 A | | 7/1996 | Thorson |
| 5,917,820 A | | 6/1999 | Rekhter |
| 6,785,277 B1 | | 8/2004 | Sundling et al. |
| 7,007,189 B2 | * | 2/2006 | Lee et al. ........................ 714/4.5 |
| 7,394,288 B1 | * | 7/2008 | Agarwal .......................... 326/39 |
| 7,412,586 B1 | * | 8/2008 | Rajopadhye ........ G06F 15/8015 712/10 |
| 7,461,210 B1 | | 12/2008 | Wentzlaff et al. |
| 7,461,236 B1 | | 12/2008 | Wentzlaff |
| 7,461,361 B2 | | 12/2008 | Rhee |
| 7,539,845 B1 | | 5/2009 | Wentzlaff et al. |
| 7,577,874 B2 | | 8/2009 | Jones et al. |
| 7,620,791 B1 | | 11/2009 | Wentzlaff |
| 7,624,248 B1 | | 11/2009 | Wentzlaff |
| 7,636,835 B1 | | 12/2009 | Ramey et al. |
| 7,734,894 B1 | | 6/2010 | Wentzlaff et al. |
| 7,734,895 B1 | | 6/2010 | Agarwal et al. |

(Continued)

FOREIGN PATENT DOCUMENTS

WO WO 2004/072796 8/2004

OTHER PUBLICATIONS

Adve, Vikram et al., "Performance Analysis of Mesh Interconnection Networks with Deterministic Routing." IEEE: Transactions on Parallel and Distributed Systems, vol. 5, No. 3, Mar. 1994, pp. 225-246.

(Continued)

*Primary Examiner* — Ilwoo Park
(74) *Attorney, Agent, or Firm* — Fish & Richardson P.C.

(57) ABSTRACT

A plurality of processor tiles are provided, each processor tile including a processor core. An interconnection network interconnects the processor cores and enables transfer of data among the processor cores. An extension network connects input/output ports of the interconnection network to input/output ports of one or more peripheral devices, each input/output port of the interconnection network being associated with one of the processor tiles such that each input/output port of the interconnection network sends input data to the corresponding processor tile and receives output data from the corresponding processor tile. The extension network is configurable such that a mapping between input/output ports of the interconnection network and input/output ports of the one or more peripheral devices is configurable.

20 Claims, 13 Drawing Sheets

(56) References Cited

U.S. PATENT DOCUMENTS

| | | | |
|---|---|---|---|
| 7,774,579 | B1 | 8/2010 | Wentzlaff et al. |
| 7,793,074 | B1 | 9/2010 | Wentzlaff et al. |
| 7,805,575 | B1 | 9/2010 | Agarwal et al. |
| 7,818,725 | B1 | 10/2010 | Agarwal et al. |
| 7,840,914 | B1 | 11/2010 | Agarwal et al. |
| 7,853,752 | B1 | 12/2010 | Agarwal et al. |
| 7,853,754 | B1 | 12/2010 | Agarwal et al. |
| 2004/0250046 | A1* | 12/2004 | Gonzalez et al. ............... 712/11 |
| 2004/0268286 | A1 | 12/2004 | New et al. |
| 2006/0150138 | A1 | 7/2006 | Rhee |
| 2006/0161875 | A1 | 7/2006 | Rhee |
| 2006/0179429 | A1 | 8/2006 | Eggers et al. |
| 2007/0180334 | A1 | 8/2007 | Jones et al. |
| 2008/0211538 | A1 | 9/2008 | Lajolo et al. |
| 2008/0229059 | A1 | 9/2008 | May |
| 2009/0103854 | A1 | 4/2009 | Beausoleil et al. |
| 2009/0103855 | A1 | 4/2009 | Binkert et al. |
| 2014/0149992 | A1* | 5/2014 | Zimmer et al. ............... 718/104 |

OTHER PUBLICATIONS

Dally et al., "Deadlock-free Message Routing in Multiprocessor Interconnection Networks," *IEEE Transactions on Computers*, C-36(5) (May 1987), pp. 547-553.

USPTO Non-Final Office Action in U.S. Appl. No. 11/404,207, mailed Nov. 13, 2008, 9 pages.

USPTO Non-Final Office Action in U.S. Appl. No. 11/404,187, mailed Feb. 5, 2009, 15 pages.

USPTO Non-Final Office Action in U.S. Appl. No. 11/404,655, mailed Mar. 23, 2009, 14 pages.

USPTO Non-Final Office Action in U.S. Appl. No. 12/130,462, mailed Mar. 3, 2009, 8 pages.

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35$_{th}$ International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages Software Caching for Raw Microprocessors," *MIT/LCS Technical Memo LCS-TM-599*, Aug. 1999.

United States Patent & Trademark Office, Non-final Office Action issued in U.S. Appl. No. 12/169,436, mailed Dec. 27, 2010, 13 pages.

United States Patent & Trademark Office, Non-final Office Action issued in U.S. Appl. No. 12/169,442, mailed Dec. 27, 2010, 11 pages.

United States Patent & Trademark Office, Non-final Office Action issued in U.S. Appl. No. 12/169,456, mailed Sep. 14, 2010, 9 pages.

United States Patent & Trademark Office, Non-final Office Action issued in U.S. Appl. No. 12/169,456, mailed Jun. 15, 2011, 12 pages.

\* cited by examiner

CONFIGURING ROUTING IN MESH NETWORKS

CROSS-REFERENCE TO RELATED APPLICATIONS

This application is a continuation of and claims the benefit of U.S. application Ser. No. 12/169,442, titled "Configuring Routing in Mesh Networks," filed on Jul. 8, 2008 (U.S. Pat. No. 8,045,546 to be issued on Oct. 25, 2011), which is incorporated herein by reference.

BACKGROUND

This document relates to configuring routing in mesh networks.

In a multi-core processor, an n-dimensional mesh topology can be used for communicating among processor cores. Packets can be routed over a mesh network between a source processor core and a destination processor core. A number of routing mechanisms can be used, e.g., deterministic routing or adaptive routing. Dimension-ordered routing is one type of deadlock-free deterministic minimal routing technique in which successive channels for traversal are assigned based on a numbering scheme determined by the dimension of the channel. The dimension-ordered routing scheme for a two-dimensional mesh is called XY-routing and that for a hypercube is called E-cube routing.

SUMMARY

This document describes various techniques, some or all of which apply equally well to a discrete system (e.g., having more than one chip) as well as to single chip systems such as a multicore processor. In a multicore processor, multiple processor cores are on one chip. In the description below, the terms "multicore processor" are used interchangeably with terms such as "tiled processor" or a "chip multiprocessor" (CMP), unless otherwise indicated in their context.

In general, in one aspect, a plurality of processor tiles are provided, each processor tile including a processor core. An interconnection network interconnects the processor cores and enables transfer of data among the processor cores. An extension network connects input/output ports of the interconnection network to input/output ports of one or more peripheral devices, each input/output port of the interconnection network being associated with one of the processor tiles such that each input/output port of the interconnection network sends input data to the corresponding processor tile and receives output data from the corresponding processor tile. The extension network is configurable such that a mapping between input/output ports of the interconnection network and input/output ports of the one or more peripheral devices is configurable.

Implementations may include one or more of the following features. The extension network connects a first portion of the input/output ports of one of the peripheral devices to a first portion of input/output ports of the interconnection network that are associated with processor tiles that are positioned closer to the peripheral device, and the extension network connects a second portion of the input/output ports of the peripheral device to input/output ports of the interconnection network that are associated with processor tiles that are positioned farther away from the peripheral device. The mapping between input/output ports of the interconnection network and input/output ports of the one or more peripheral devices is configurable by software. One or more peripheral devices are provided, in which each peripheral device and a portion of the extension network are defined using a hardware macro, and the same hardware macro is used to define at least two peripheral devices and their corresponding portions of the extension network. Network switches enable several peripheral devices to be connected through the extension network. The peripheral devices include, for example, a memory controller. The interconnection network includes N dimensions, N being an integer. The interconnection network includes, for example, a mesh network.

In general, in another aspect, a plurality of processor cores are provided, an interconnection network interconnects the processor cores and enables transfer of data among the processor cores, and an extension network connects input/output ports of the interconnection network to input/output ports of one or more peripheral devices. Each input/output port of the interconnection network is associated with one of the processor cores such that each input/output port of the interconnection network sends input data to the corresponding processor core and receives output data from the corresponding processor core. The extension network is configurable such that a mapping between input/output ports of the interconnection network and input/output ports of the one or more peripheral devices is configurable.

In general, in another aspect, a two-dimensional array of processor tiles is provided, each processor tile including a processor core, and a two-dimensional mesh network interconnects the processor cores and enables transfer of data among the processor cores. An extension network connects input/output (I/O) ports of the mesh network to I/O ports of at least a first peripheral device and a second peripheral device, the I/O ports of the mesh network being associated with a row or a column of the processor tiles at an edge of the array of processor tiles such that each I/O port sends input data to the corresponding processor tile and receives output data from the corresponding processor tile. The first peripheral device is located closer to a first half of the processor tiles, the second peripheral device is located closer to a second half of the processor tiles, the extension network connects some I/O ports of the first peripheral device to I/O ports of the mesh network that are associated with processor tiles in the first half of the processor tiles, the extension network connects some I/O ports of the first peripheral device to I/O ports of the mesh network that are associated with processor tiles in the second half of the processor tiles, the extension network connects some I/O ports of the second peripheral device to I/O ports of the mesh network that are associated with processor tiles in the first half of the processor tiles, and the extension network connects some I/O ports of the second peripheral device to I/O ports of the mesh network that are associated with processor tiles in the second half of the processor tiles.

In another aspect, in general, a processor includes a plurality of processor tiles, each tile including a processor core, and an interconnection network interconnects the processor cores and enables transfer of data among the processor cores, the interconnection network having a plurality of dimensions in which an ordering of dimensions for routing data is configurable.

Implementations may include one or more of the following features. The interconnection network has a first dimension and a second dimension, and the mesh network is selectable between at least two configurations, the first configuration routing data along the first dimension before routing the data along the second dimension, the second configuration routing data along the second dimension before routing the data along the first dimension. The plurality of processor cores include a two-dimensional array of rows and columns of processor cores, a top row of processor cores are connected to input/ output ports that are coupled to corresponding input/output ports of a peripheral device. When there are more data being sent from the peripheral device to the processor cores, the mesh network is configured to route data along a column direction followed by routing the data along a row direction. When there are more data being sent from the processor cores to the peripheral device, the mesh network is configured to route data along a row direction followed by routing the data along a column direction. The peripheral device includes, for example, a memory controller interface. The ordering of dimensions for routing data is configurable by software. The software can include an operating system or a hypervisor. The processor includes a register to store information indicating the ordering of dimensions for routing data. The mesh network has an X-dimension, a Y-dimension, and a Z-dimension, and the mesh network is selectable among six configurations that route data in the order of (X, Y, Z), (X, Z, Y), (Y, X, Z), (Y, Z, X), (Z, X, Y), and (Z, Y, X) dimensions, respectively. The mesh network has N dimensions, N being an integer, and the mesh network is selectable among N! configurations that route data along the N dimensions in various orderings. Each tile includes a routing arbiter to determine a path for routing data through the mesh network. The routing arbiter determines an ordering of dimensions of the routing based on coordinates of the routing arbiter, destination coordinates of the data, and a dimension ordering policy. The routing arbiter routes the data in a dimension along a dimension having a highest priority specified in the dimension ordering policy if the arbiter and the destination of the data do not have any coordinates in common. The interconnection network includes a mesh network. The ordering of dimensions for routing data is configured to reduce or eliminate a skin effect and increase throughput of the interconnection network.

In general, in another aspect, a system includes a processor that has a plurality of processor tiles, each tile having a coordinate, each tile including a processor core, and a routing arbiter to determine a path for routing data through a multi-dimensional interconnection network that interconnects the processor cores and enables transfer of data among the processor cores. The system includes a memory controller having input/output ports that are coupled to corresponding input/output ports of some of the processor cores, and a first dimension register that is programmed to store information indicating the ordering of dimensions for routing data. When each of the routing arbiters receives a packet, the routing arbiter queries the first dimension register to determine a dimension ordering policy, and determines an ordering of dimensions for routing the packet based on coordinates of the routing arbiter, destination coordinates of the packet, and the dimension ordering policy.

In general, in another aspect, a processor includes a plurality of processor cores, and an interconnection network to interconnect the processor cores and enable transfer of data among the processor cores, the interconnection network having a plurality of dimensions in which an ordering of dimensions for routing data is configurable.

In general, in another aspect, a processor includes a plurality of processor tiles, each tile including a processor core, and an interconnection network interconnects the processor cores and enables transfer of data among the processor cores. The interconnection network has a plurality of dimensions in which a first ordering of dimensions is used for routing data from an input/output device to the processor cores, and a second ordering of dimensions is used for routing data from the processor cores to the input/output device, the second ordering of dimensions being different from the first ordering of dimensions.

Implementations may include one or more of the following features. The plurality of processor cores include a two-dimensional array of rows and columns of processor cores, a first row of processor cores are connected to input/output ports that are coupled to corresponding input/output ports of a peripheral device. In some examples, there are more data being sent from the peripheral device to the processor cores, and the first ordering of dimensions specifies that data are to be routed along a column direction followed by routing the data along a row direction. In some examples, there are more data being sent from the processor cores to the peripheral device, and the second ordering of dimensions specifies that data are to be routed along a row direction followed by routing the data along a column direction.

In general, in another aspect, a plurality of processor tiles are provided, each processor tile including a processor core, and an interconnection network interconnects the processor cores and enables transfer of data among the processor cores. The interconnection network has a plurality of dimensions and is configurable to transmit data from an initial processor core or an input/output device to an intermediate processor core based on a first dimension ordering policy, and from the intermediate processor core to a destination processor core. The first dimension ordering policy specifies an ordering of the dimensions of the interconnection network when routing data through the interconnection network.

Implementations may include one or more of the following features. The data is routed from the intermediate processor core to the destination processor core based on a second dimension ordering policy. Software is provided to select one of the processor cores as the intermediate processor core, the software being capable of identifying different intermediate processor cores for different applications. The intermediate processor core is selected to reduce or eliminate a skin effect and increase throughput of the interconnection network. In some examples, the initial processor core generates headers of data packets such that the data packets can be routed through the intermediate processor core. In some examples, the data is transmitted in a packet having a first header and a second header, the first header is used to route the packet from the initial processor core to the intermediate processor core, and the intermediate processor core is configured to remove the first header to expose the second header. In some examples, the intermediate processor core is capable of updating the header of a data packet and generating the header for a remaining portion of the route to the destination processor core.

In general, in another aspect, a processor includes a plurality of processor tiles, each tile comprising a processor core, and an interconnection network to interconnect the processor cores and enable transfer of data among the processor cores. The interconnection network has a plurality of dimensions in which a first ordering of dimensions is used for routing data from an input/output device to intermediate points, a second ordering of dimensions is used for routing data from the intermediate points to the processor cores, a third ordering of dimensions is used for routing data from the processor cores to the intermediate points, and a fourth ordering of dimensions is used for routing data from the intermediate points to the input/output device. At least two of the first, second, third, and fourth orderings of dimensions are different.

Implementations may include one or more of the following features. The plurality of processor cores include a two-dimensional array of rows and columns of processor cores, a first row of processor cores are connected to input/output ports that are coupled to corresponding input/output ports of a peripheral device, wherein there are more data being sent from the peripheral device to the processor cores, and the first ordering of dimensions specifies that data are to be routed along a column direction followed by routing the data along a row direction. The plurality of processor cores include a two-dimensional array of rows and columns of processor cores, a first row of processor cores are connected to input/output ports that are coupled to a peripheral device, wherein there are more data being sent from the processor cores to the peripheral device, and the fourth ordering of dimensions specifies that data are to be routed along a row direction followed by routing the data along a column direction.

In general, in another aspect, a plurality of processor cores are provided, and an interconnection network interconnects the processor cores and enables transfer of data among the processor cores, the interconnection network having a plurality of dimensions. The interconnection network is configurable to transmit data from an initial processor core or an input/output device to an intermediate processor core based on a first dimension ordering policy, and from the intermediate processor core to a destination processor core, the first dimension ordering policy specifying an ordering of the dimensions of the interconnection network when routing data through the interconnection network.

In general, in another aspect, a processor includes a plurality of processor tiles, each processor tile including a processor core, and a multi-dimensional interconnection network to interconnect the processor cores and enable transfer of data among the processor cores. A memory controller has input/output ports that are coupled to corresponding input/output ports of some of the processor cores. The processor is configured to route read data packets from the memory controller to one or more intermediate processor cores based on a first dimension ordering policy, and from the one or more intermediate processor cores to destination processor cores based on a second dimension ordering policy, the read data packets from the memory controller each having a header specifying an address of an intermediate processor core. The processor is configured to route write data packets from one or more processor cores to one or more intermediate processor cores based on a third dimension ordering policy, and from the one or more intermediate processor cores to the memory controller based on a fourth dimension ordering policy, the write data packets from the processor cores each having a header specifying an address of an intermediate processor core.

In general, in another aspect, a data packet is received at a first processor core, the data packet having a destination that corresponds to a second processor core, in which the first and second processor cores are part of an array of processor tiles, each processor tile including a processor core. A header of the data packet is modified to specify an intermediate processor core, and the data packet is routed from the first processor core to the intermediate processor core through an interconnection network that interconnects the array of processor tiles, then the data packet is routed from the intermediate processor core to the second processor core.

Implementations may include one or more of the following features. The intermediate processor core is selected to reduce or eliminate a skin effect. Intermediate processor cores are determined by a mapping table which can be programmed by software. An intermediate processor core is capable of determining a next intermediate processor core based on a dimension ordering policy.

These and other aspects and features, and combinations of them, may be expressed as methods, apparatus, systems, means for performing functions, and in other ways.

Advantages of systems, methods, aspects and features described above can include one or more of the following. The negative impact of skin effect on routing data can be reduced. Affinity restrictions on the placement of input/output devices can be reduced or removed. The dimension ordering policy can be dynamically configured according to the type of data being transmitted to avoid data congestion at certain locations in a network. Multiple dimension ordering policies can be used when routing data to provide flexibility in meeting specific application requirements.

Other features and advantages of the invention are apparent from the following description, and from the claims.

DESCRIPTION

In the following, we describe a "skin effect" that may occur in some mesh networks using dimension-ordered routing. An "affinity restriction" that may affect the placement of hardware components, such as locations of memory and memory controllers, is described. A number of ways to reduce the negative impact of the skin effect are described, e.g., by using an extension of the mesh network to input/output (I/O) devices, a configurable routing scheme, and/or a stacked dimension ordered routing. Ways to reduce or remove the affinity restriction are also described.

For a description of a tiled architecture that can be used to implement a processor array that communicates through an interconnection network, such as a mesh network, see the section "Tiled Architecture" below. The tiled architecture is also described in U.S. application Ser. No. 11/404,958, titled "Managing Data in a Parallel Processing Environment", filed on Apr. 14, 2006, incorporated herein by reference. In some implementations, a mesh network can allow processors of a processor array to send multi-word messages or scalar values through the network. The mesh network can be a static network or a dynamic network. Static networks switch according to switch instructions determined at compile time, whereas dynamic networks switch according to message headers determined at run time. In a dynamic network, a processor can directly send packets having packet headers and payload data to the mesh network, and the mesh network will take care of delivering the packet to the appropriate receiver, which can be, e.g., a different processor or an input/output device.

Skin Effect

As technology advances, more and more input/output devices, such as memory controllers, are integrated into a multi-core processor. An input/output device can be connected to the multi-core array through multiple networks. A message based protocol can be used so that any processor can communicate with the input/output device. For example, a message based protocol used by a dynamic network is described in U.S. patent application Ser. No. 11/404,958.

Figure 1:
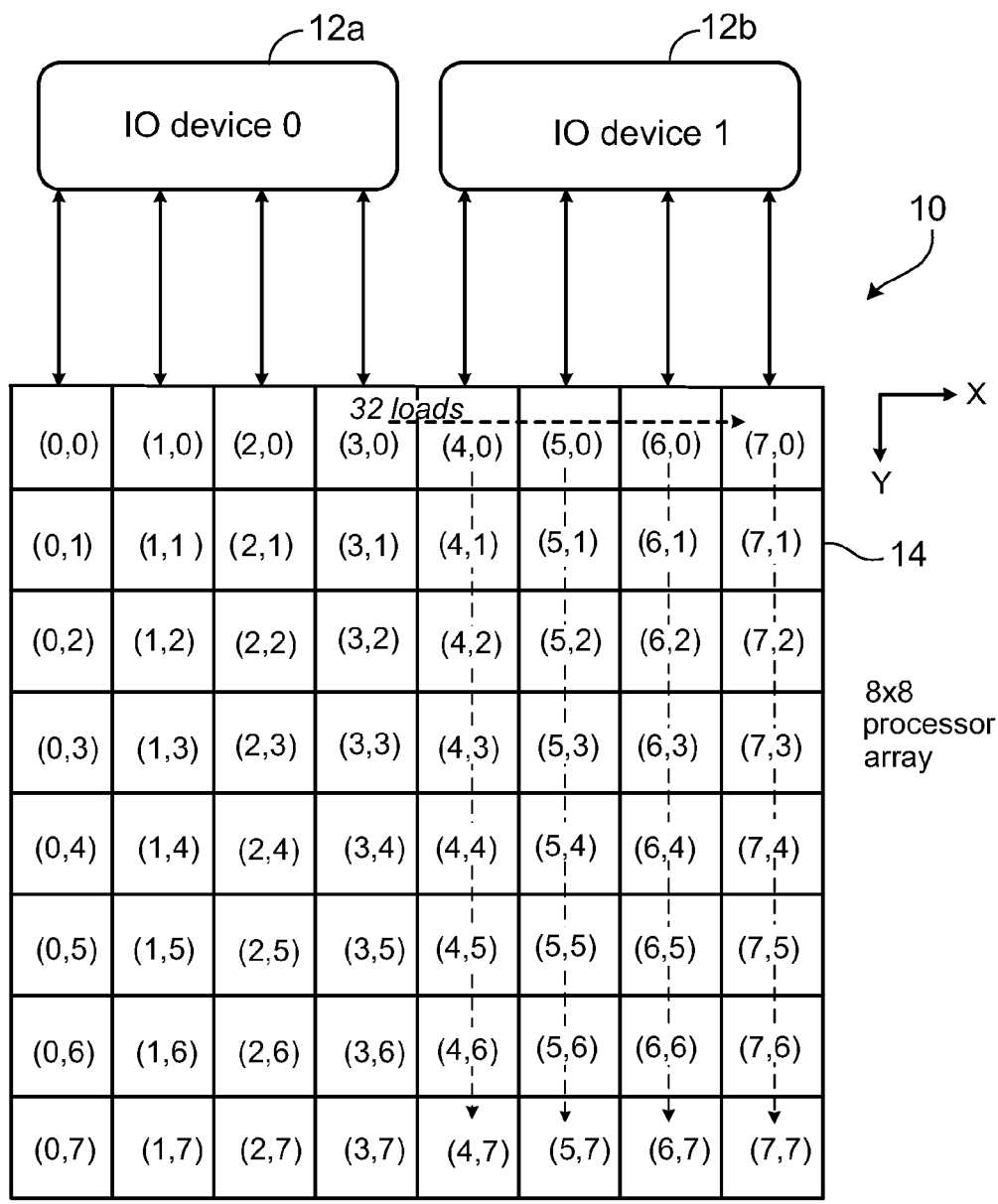
FIG. 1 is a diagram showing two memory controllers connected to an array of processors.

FIG. 1 is a diagram of an example 8×8 processor array 10, with processor cores labeled from (0,0) to (7,7). For example, the processor array 10 can include an array of processor tiles 14, each tile including a processor core. Input/output devices 12a and 12b (collectively 12) are attached at the top of the processor array 10 through a two-dimensional mesh network. In this example, each device has four ports connected to the array 10, in which each port is connected to a different one of four tiles across the top of the array. In other examples, some devices may have a single port connected to a single tile, or a single device may be connected to any number of tiles over different ports.

In this example, dimension ordered routing is used, with X being the first direction in which a message is routed, and Y being the second direction in which a message is routed. In this example, requests from the processor array 10 destined for an input/output device travel in the X direction until the requests are vertically below one of the ports of a given one of the input/output devices 12a or 12b. Once a request is below a destination port of a given input/output device, the request is routed vertically to the input/output device. Responses coming from the input/output devices 12 travel in the processor array 10 in the X direction first, then the Y direction. This may result in the case where responses for the entire processor array 10 are first routed across a one dimensional array of links (the horizontal links that connect the eight cores from core(0,0) to core(7,0) directly below the input/output device 12), having the network performance similar to a pipelined bus. This is referred to as the "skin effect". The skin effect can become significant when large amounts of data are exchanged between the input/output devices 12 (e.g., memory controllers) and the processor cores.

The terms "horizontal", "vertical", "top", "bottom", "left", and "right" are used to describe relative directions or positions as shown in the figures. The system described in this document can be used in various orientations, thus when we say a signal travels in the vertical direction, it means that the signal travels in the vertical direction as shown in the figure, and does not necessarily mean that the signal travels in a vertical direction using earth as a reference. For example, when we say that an input/output device is coupled to a top row of the processor array 10, it means that for a certain orientation of the processor array 10 (e.g., when the processor array 10 is placed on a circuit board oriented vertically), the edge row being coupled to the input/output device can be regarded as the top row. The processor array 10 can be placed horizontally such that the "top row" is on the same height as the other rows, and the processor array 10 can also be oriented such that what we call the "top row" is actually below the other rows.

When we say that data travel in the X direction, the data can be traveling in the +X direction or the −X direction depending on relative positions of source and destination. Similarly, when we say that data travel in the Y direction, the data can be traveling in the +Y direction or the −Y direction depending on relative positions of source and destination.

For an input/output device 12 connected to the first-dimension (X-dimension in FIG. 1) at the top of the processor array 10, most of the packets originating from the input/output device 12 tend to stay on the skin of the mesh network (e.g., the edge of the mesh network), especially the congested connection between core(3,0) and core(4,0), which carries traffic for the 32 processor cores on the right half of the processor array 10. All traffic sourced from any of the ports of the input/output device 0 (12a) and destined to the right half of the processor array 10 go through the connection between core(3,0) and core(4,0), assuming X-first dimension ordered routing.

Note that a traditional single core processor or a multi-core processor with a traditional bus architecture may not have the skin effect problem.

Affinity Restriction

As a multi-core processor integrates more cores, multiple external memory interfaces may be necessary. There can be various types of affinity. In addition to processor affinity and cache homing affinity, there can be memory/IO affinity. For a given processor core, it is useful to allocate the memory accessed by that processor (for example, using its normal load and store instructions) to the nearest memory controller. This way, that processor core's memory requests that miss the core's local cache will travel a shorter distance than if the memory were allocated on a memory controller that was further away. This is referred to as the "affinity restriction".

This restriction may introduce complexity to the system level software. First, memory requirements for each processor may be different. Second, each memory interface may have different external memory characteristics (e.g., capacity). It is not simple to implement optimized memory affinity. Therefore, it may be desirable to reduce or remove this affinity restriction.

Note that a traditional multi-core processor with mesh network but single memory controller may not have the affinity restriction problem.

System Overview

In the following, we describe three mechanisms to mitigate the performance impact of the skin effect in dimension ordered networks. These mechanisms also result in reducing the affinity restriction (the restriction where cores should be physically close to the input/output devices with which they communicate).

The first mechanism is to provide a mesh I/O extension network that extends the mesh network to peripheral devices, e.g., input/output devices. The skin effect caused by input/output devices can be reduced or removed in a mesh network that uses dimension-ordered routing. The mesh I/O extension network adds additional network links between the I/O ports of the mesh network and the peripheral devices (e.g., memory controllers) and the mesh network between the tiles (a tiled architecture having an array of tiles are described below). The additional network links reduce or eliminate the negative effects of the skin effect.

The second mechanism is to provide configurable dimension ordered routing. The skin effect can be reduced by biasing the routing algorithm such that the skin effect only occurs for the traffic type that requires the least amount of bandwidth. For example, if the sizes of responses from the devices are much larger than requests from the cores, a dimension ordered routing algorithm can be configured to use the Y dimension as the first direction that is routed and the X dimension as the second direction that is routed. In such an example, in the processor array 10, requests will be routed up to the "skin" row of processor cores first and then routed across the skin row, and the responses will be routed down a column of processor cores first and then through different rows of processor cores instead of just the skin row, depending on the destination of each response.

The third mechanism is to provide stacked dimension ordered routing, meaning that data packets are routed according to two or more dimension ordering policies. For example, the skin effect can be reduced by introducing one or more intermediate routing points between the source and destination pair. A data packet can be routed from a starting processor core to an intermediate processor core according to a first dimension ordering policy, and routed from the intermediate processor core to a destination processor core according to a second dimension ordering policy. The operation system or a hypervisor selects the intermediate points and provides flexibility to meet specific application requirement.

The three mechanisms described above can result in reducing the affinity restriction (the restriction where cores are preferably physically close to the input/output devices with which they communicate). This improves system performance, and reduces design complexity for the system level software.

Mesh Network Extension

Figure 2:
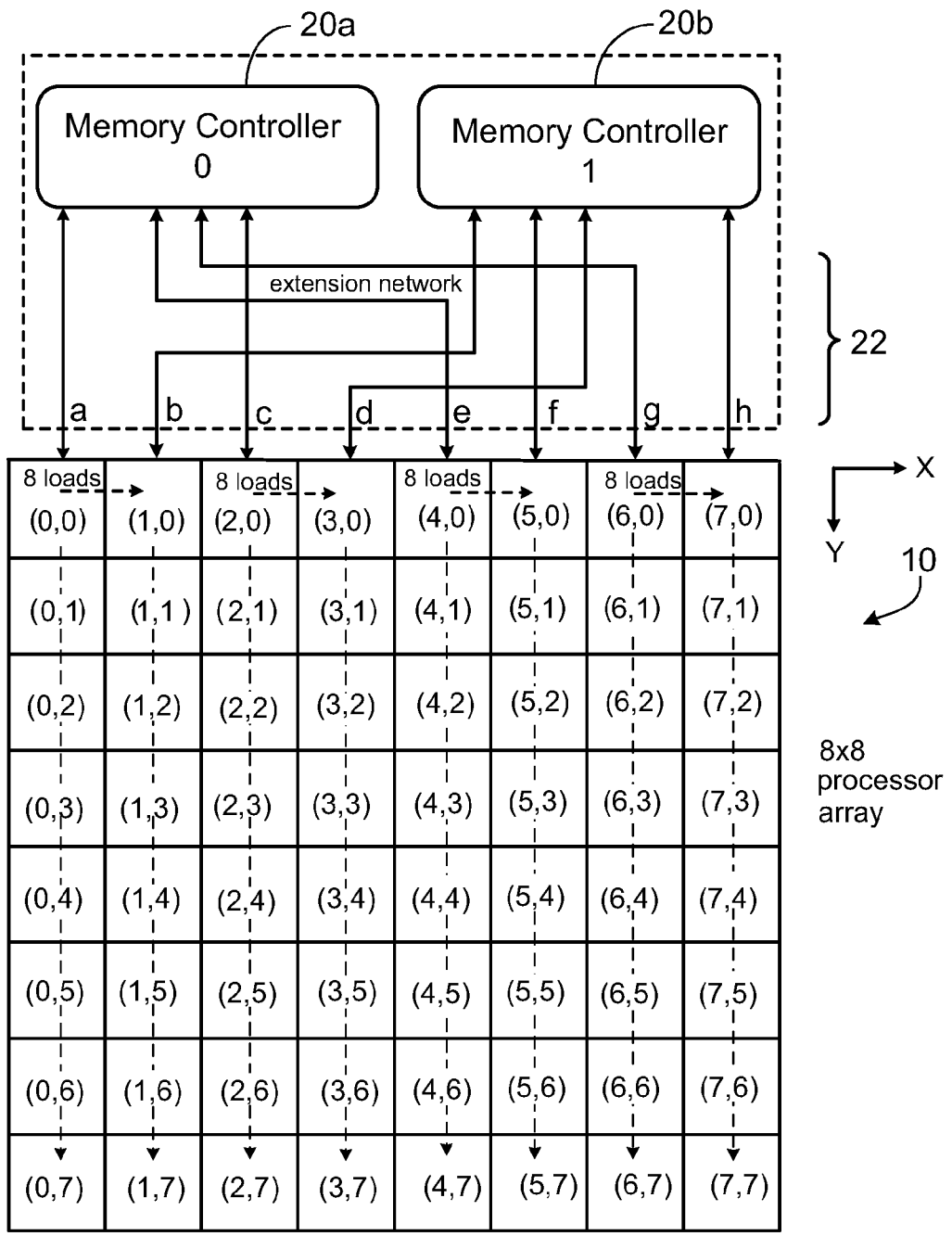
FIG. 2 is a diagram showing an extension network that connects two memory controllers to an array of processors.

Referring to FIG. 2, in some examples, input/output devices, e.g., memory controllers 20 (including 20a and 20b), are connected to a multi-core array 10 through multiple dynamic networks. On the vertical dimension, a memory controller 0 (20a) connects to the mesh network through four dynamic networks (a, c, e, g), and memory controller 1 (20b) connects to the mesh network through four dynamic networks (b, d, f, h).

An "extension network" 22 is provided between the two memory controllers 20a and 20b and the mesh network interconnecting the processor cores 10. Heavy traffic (due to skin effect) can be off-loaded from the top row of the mesh network to the extension network 22. This way, the busiest connection has 8 loads of traffic, e.g., between core(0,0) and core(1,0), between (core 2,0) and core(3,0), between core(4,0) and core(5,0), and between core(6,0) and core(7,0). By comparison, a design without using the extension network 22 may have 32 loads at the busiest connection, such as between core(3,0) and core(4,0) in the example of FIG. 1.

Table 1 below lists example routes between example source and destination pairs. The examples assume a dimension ordering policy that routes data packets along the X direction first, followed by the Y direction.

TABLE 1

| Source | Destination | Route |
| --- | --- | --- |
| Memory controller 0 | A core (0,*) on column 0 | Network a |
| Memory controller 0 | A core (1,*) on column 1 | Network a, one hop on the on-chip mesh in the horizontal direction |
| Memory controller 0 | A core (6,*) on column 6 | Network g |
| Memory controller 0 | A core (7,*) on column 7 | Network g, one hop on the on-chip mesh in the horizontal direction |
| Memory controller 1 | A core (0,*) on column 0 | Network b, one hop on the on-chip mesh in the horizontal direction |

TABLE 1-continued

| Source | Destination | Route |
| --- | --- | --- |
| Memory controller 1 | A core (1,*) on column 1 | Network b |
| Memory controller 1 | A core (6,*) on column 6 | Network h, one hop on the on-chip mesh in the horizontal direction |
| Memory controller 1 | A core (7,*) on column 7 | Network h |
| A core (0,*) on column 0 | Memory controller 0 | Network a |
| A core (1,*) on column 1 | Memory controller 0 | Network a, one hop on the on-chip mesh in the horizontal direction |

For each processor core, the distances to memory controller 0 (20a) and memory controller 1 (20b) is similar. For example, if core(3,1) reads from the memory controller 0 (20a), traffic will go through route "c", one hop from core(2, 0) to core(3,0), and one hop from core (3,0) to core (3,1). If core(3,1) reads from the memory controller 1 (20b), traffic will go through route "d", and one hop from core(3,0) to core(3,1).

The examples above indicate that "affinity restriction" becomes less of a restriction to the memory controllers 20, at least on the X dimension.

If there are memory controllers on the other side of the chip, e.g., the bottom side, latency from a processor core, e.g., core (3,1), to a memory controller on the top side can be different from the latency to a memory controller on the bottom side. However, since the Y dimension is not the first-order dimension, traffic loadings on the Y dimension are more evenly distributed. Less network congestion results in more predictable latency.

Figure 3:
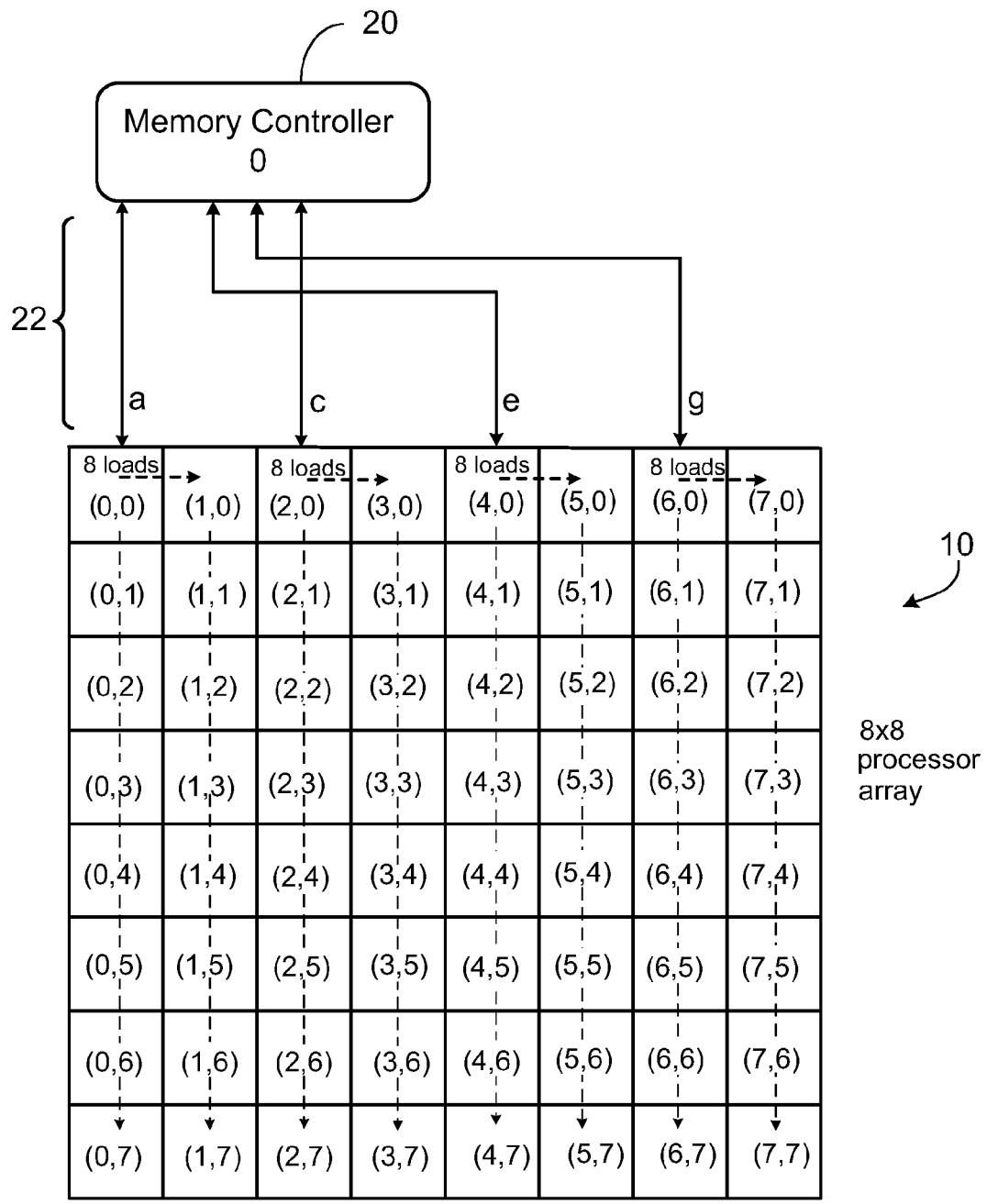
FIG. 3 is a diagram showing an extension network that connects a memory controller to an array of processors.

Referring to FIG. 3, if there is only one memory controller 20, the extension network 22 can still be useful. For example, it may be preferable that the memory controller 20 connects the 8×8 processor array 10 through routes "a", "c", "e", g", instead of having the memory controller 20 connect to core (0,0), core (1,0), core (2,0), and core (3,0). The extension network 22 can serve as a fast bypass lane to reach the destination.

The extension network 22 can be implemented in many ways. The following are some examples.

Figure 4A:
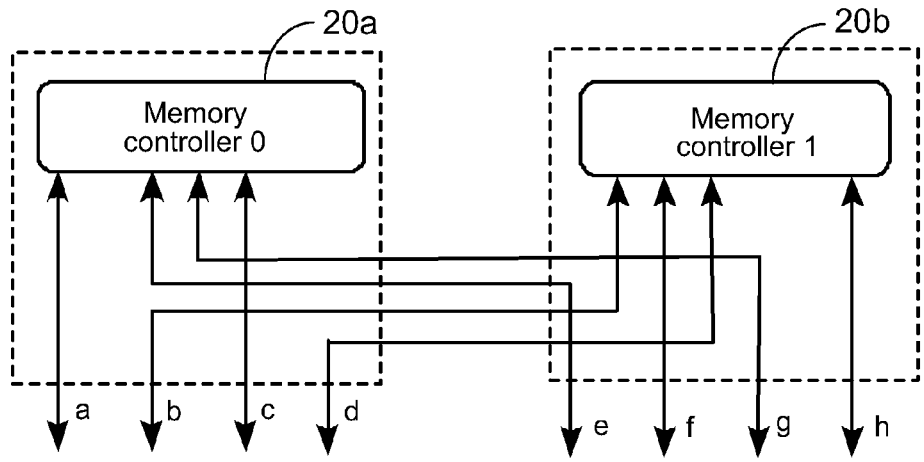
FIG. 4A is a diagram of a logical representation of an extension network.

FIG. 4A is a diagram of a logical representation of the extension network 22 in FIG. 3.

Figure 4B:
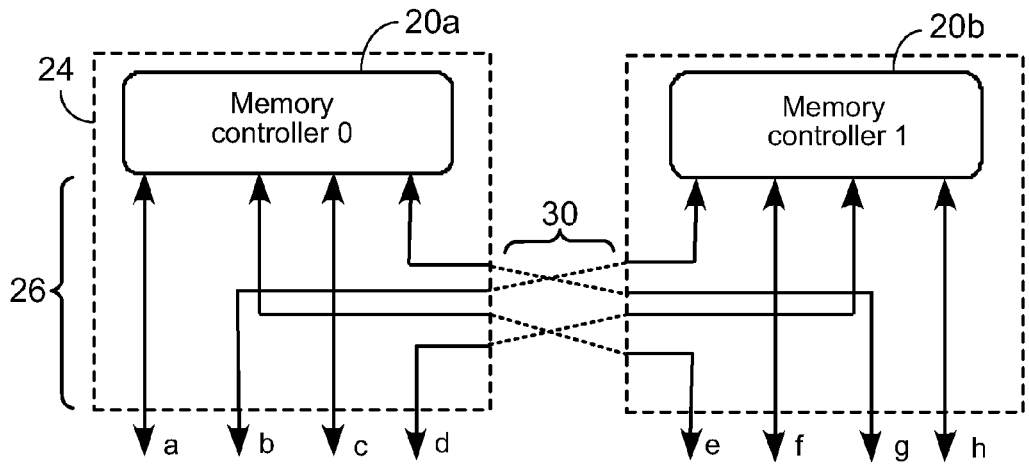
FIG. 4B is a diagram showing connections between memory controllers.

FIG. 4B is a diagram showing example connections between memory controllers. Each memory controller 20 can be implemented as the same physical hardware macro 24 that includes logic for implementing the memory controller 20 and connection lines 26 for implementing a portion of the extension network 22. Top level connections 30 can be configured to connect the various portions of the extension network 22 so that data packets from one memory controller 20 can be routed to the connection lines 26 associated with other memory controllers 20, allowing data packets to move through the extension network 22.

Figure 4C:
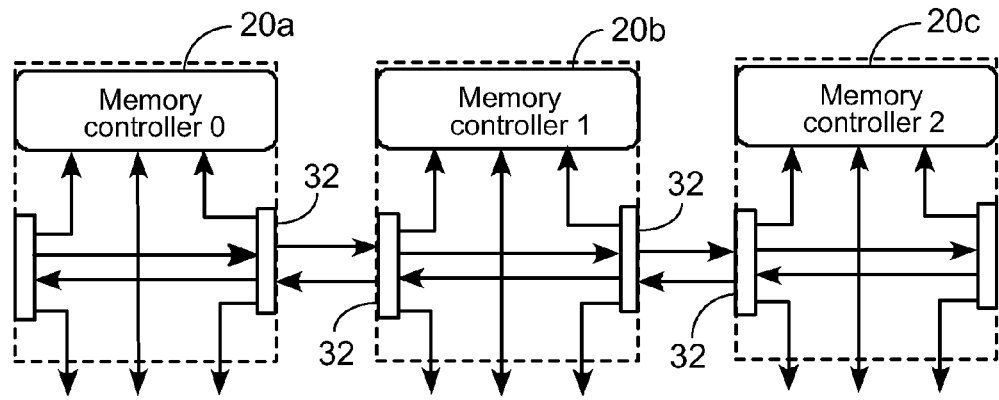
FIG. 4C is a diagram showing built-in network switches that chain several memory controllers.

FIG. 4C is a diagram showing example built-in network switches 32 that chain several memory controllers (e.g., 20a, 20b, 20c). The processor cores communicate with the memory controllers 20 using a message-based protocol. The network switches 32 know where the messages are targeted, and switch the messages appropriately. Switches generally look at a header word in a message and route the message according to the destination or direction indicated in the header word. The switch decision in terms of which of the various incoming messages to route next can be based on round-robin choice, or based on quality of service criteria.

The examples of configurations for connections and switches shown in FIGS. 4B and 4C can be modified in various ways.

Configurable Dimension Ordered Routing

Configurable dimension-ordered routing can help reduce the skin effect. Some peripherals may have more traffic to the multi-core array, while other peripherals may have more traffic from the multi-core array. For example, a memory controller delivers more bandwidth than the Ethernet interface. In some examples, high-traffic peripherals are placed on the opposite side of the chip, e.g., on the top and the bottom sides, or on the left and right sides.

The first dimension can be chosen based upon where the high traffic peripheral is placed and whether there is more traffic to the peripheral or more traffic from the peripheral.

Figure 5:
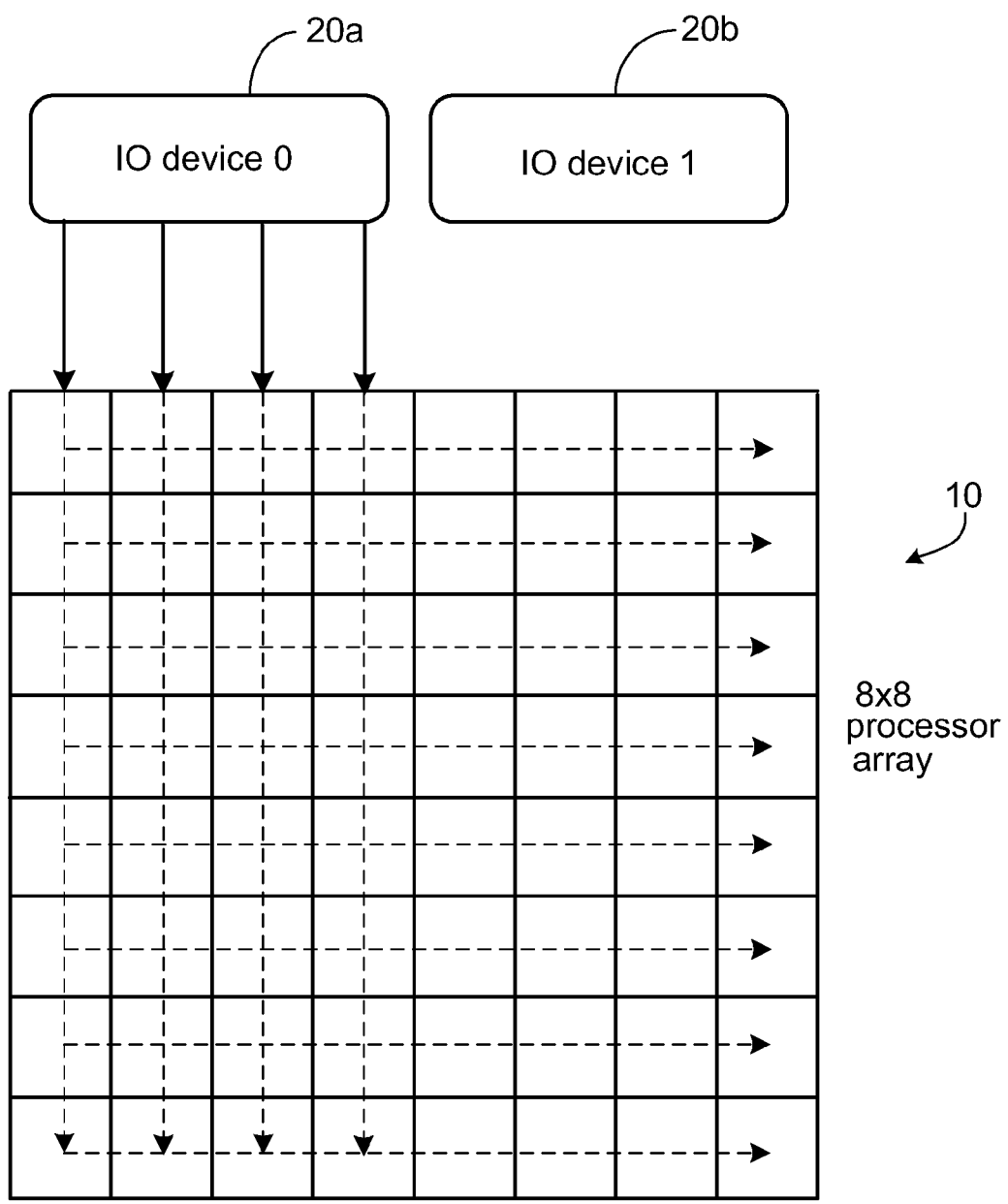
FIG. 5 is a diagram showing data being routed along a column-direction then routed along a row-direction.

Referring to FIG. 5, if a memory controller 20 is coupled to half of the top (or bottom) row of the processor array 10 and if there is more data transmitted in response to memory reads (data traveling from the I/O device 20 to the processor core) than memory writes (data traveling from the processor core to the I/O device 20), then the Y-dimension can be the first dimension. This results in requests going across the skin of the mesh network, and responses fully utilizing the mesh network.

In the example of FIG. 5, the traffic is sent from one I/O device 20a to many cores. Half of the traffic needs to move in the X dimension from left to right. All traffic (from left to right) come from the top row, so it is better not to move in the X dimension right away (resulting in skin effect). A Y-first routing is preferred so that multiple routing resources in the X dimension can be used. The read data sent from the I/O device 20a to the processor cores initially travel along the Y-dimension using multiple columns, then travel in the X-dimension. In this example, we say that the "ordering of dimensions" is Y-dimension first, X-dimension second for routing the read data. In this description, the term "ordering of dimensions" refers to the sequence of dimensions in which data are routed.

Figure 6:
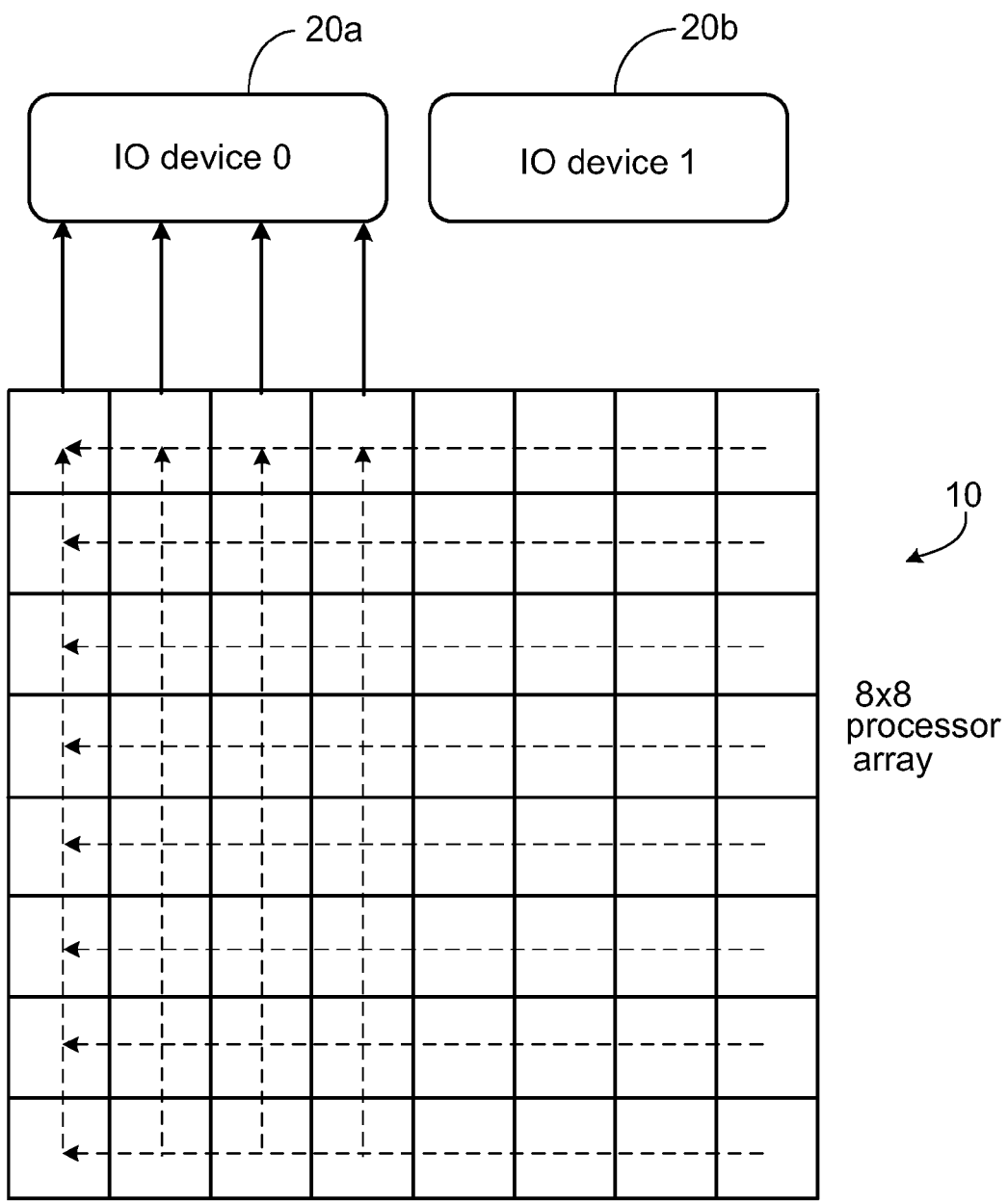
FIG. 6 is a diagram showing data being routed along a row-direction then routed along a column-direction.

Referring to FIG. 6, if a memory controller 20 is coupled to half of the top (or bottom) row of the processor array 10 and if there are more memory writes than memory reads, the X-dimension can be the first dimension for write data sent from the processor cores to the memory controller 20. The write data originating from the processor cores initially travel along the X-dimension using multiple rows to avoid congestion. The write data then travel in the Y-dimension to the memory controller 20. In this example, we say that the ordering of dimensions is X-dimension first, Y-dimension second for routing the write data.

Since there are less read data than write data, the X-dimension can also be the first dimension for read data being returned by the memory controller 20. Although some read data may concentrate on the first row, this routing scheme allows more bandwidth to be reserved for routing write data along the $2^{nd}$ to $8^{th}$ rows (the $1^{st}$ row being the top row and the $8^{th}$ row being the bottom row in this example).

In some implementations, if the memory controller 20 is coupled to half of the left-most (or right-most) column of the processor array 10 and if there are more memory reads than memory writes, then the X-dimension can be selected as the first dimension for routing read data from the memory controller 20 to the processor cores.

If the memory controller 20 is coupled to half of the left-most (or right-most) column of the processor array 10 and if there are more memory writes than memory reads, then the Y-dimension can be selected as the first dimension for routing write data from the processor cores to the memory controller 20.

Figure 7:
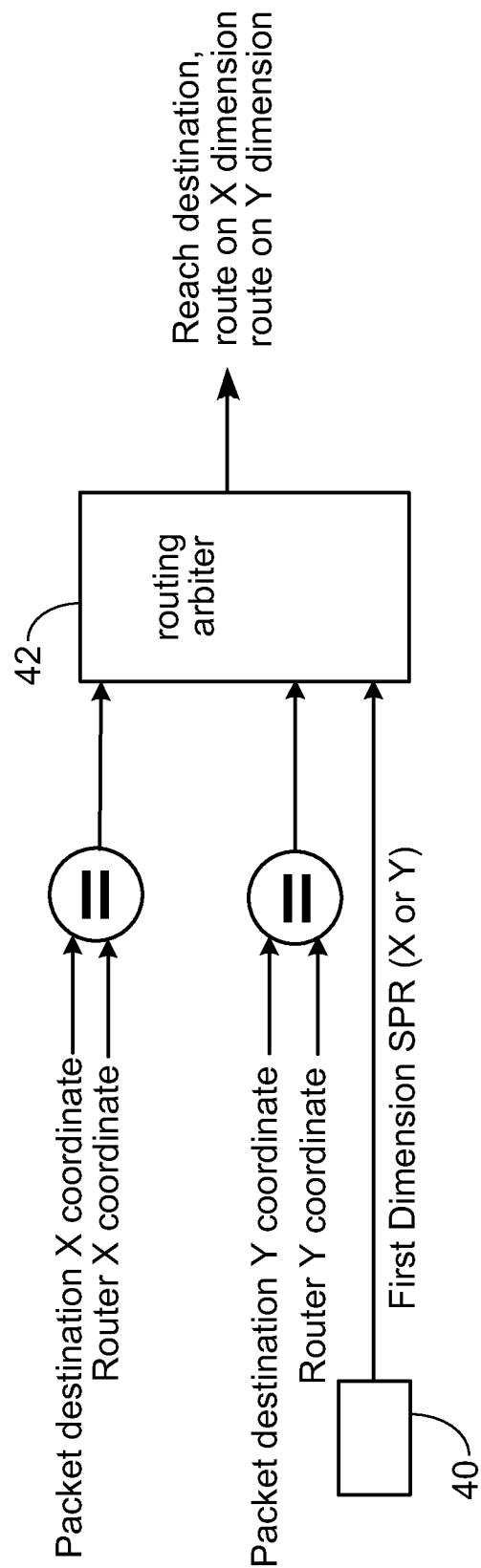
FIG. 7 is a diagram showing a routing decision module.

Referring to FIG. 7, the configurability of the dimension ordering may be implemented via a first dimension special purpose register (SPR) 40 that is programmed during boot time. Within each processor tile is a routing arbiter 42 (also referred to as a router) that routes data packets. When the routing arbiter 42 receives a packet, the routing arbiter 42 queries the first dimension SPR 40 to determine the dimension ordering policy (i.e., what the first dimension is, X or Y). Each packet has its destination (with X and Y coordinates) in the packet header. Each router 42 has its own X and Y coordinates. The routing arbiter 42 compares the packet destination with its own X and Y coordinates, and routes the packet based on the comparison and the information from the first dimension SPR 40. Examples of the decision making is described in Table 2.

TABLE 2

| X matches | Y matches | First dimension | Routing decision |
|---|---|---|---|
| 1 | 1 | Don't care | Destination is reached, because both X coordinates and Y coordinates are matched. |
| 1 | 0 | Don't care | Route on Y dimension, because X coordinates are matched. |
| 0 | 1 | Don't care | Route on X dimension, because Y coordinates are matched. |
| 0 | 0 | X | Route on X dimension, because both X and Y coordinates are not matched, router has to check the First Dimension SPR and then decide to route on X dimension in this case. |
| 0 | 0 | Y | Route on Y dimension, because both X and Y coordinates are not matched, router has to check the First Dimension SPR and then decide to route on Y dimension in this case. |

Some peripherals may have multiple connections to the on-chip mesh network. One connection may have more traffic sourced from the peripheral, while another connection may have more traffic sent to the peripheral. Depending on how the dimension ordering is applied in the application, how the peripheral connects to the on-chip mesh network has an impact to the network congestion.

Figure 8:
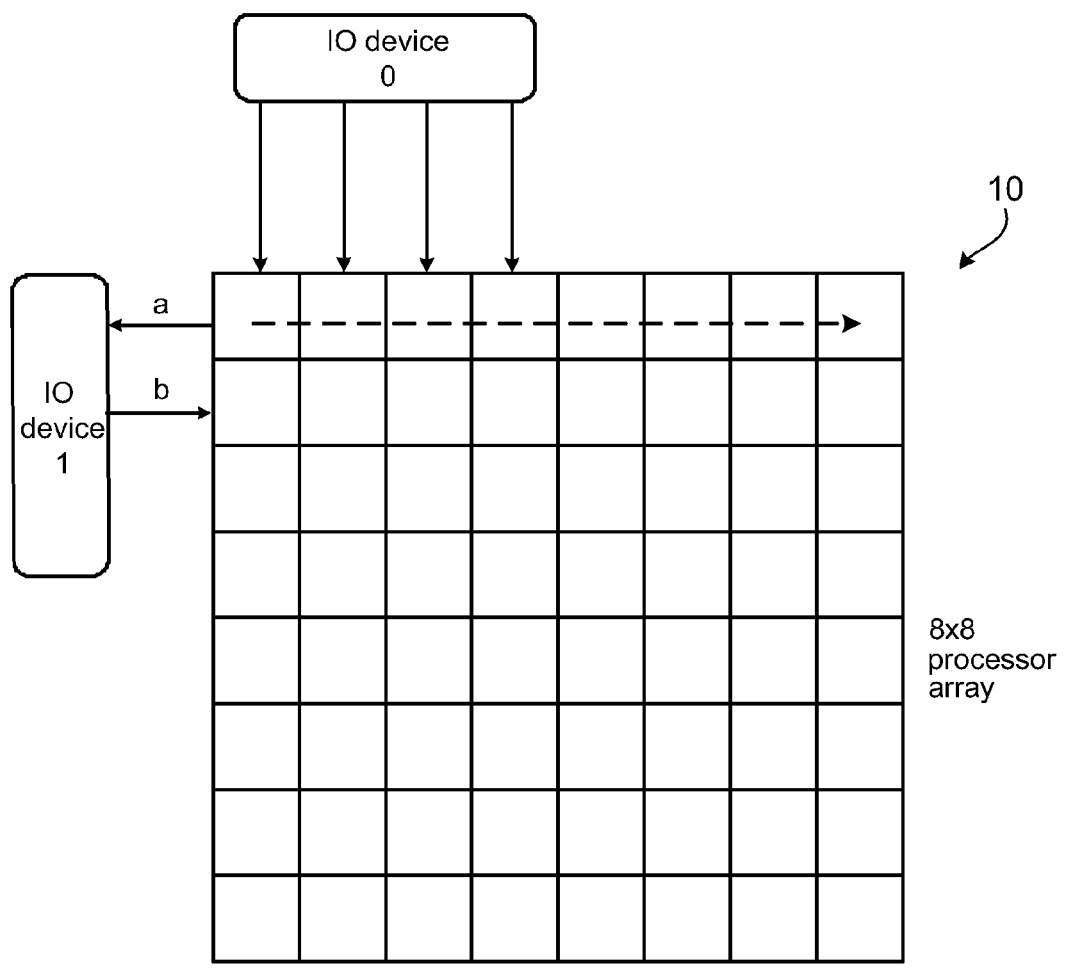
FIG. 8 is a diagram showing input/output devices placed at adjacent sides of an array of processors.

Referring to FIG. 8, one extension to the configurable dimension ordered routing method is to choose carefully where input/output devices are placed. Certain input/output devices have more traffic than the other input/output devices. If input/output devices with heavy traffic are not connected to the first-dimension, then skin effect is reduced. For example, input/output device can be put on the left or right side of the processor array 10 if X is the first dimension and if there is more traffic from the input/output device to the processor array.

In the example of FIG. 8, some row, e.g., top row, may have more traffic due to dimension ordered routing. Much of the data transmitted from input/output device 0 to the processor cores pass through the top row. Input/output device 1 may have multiple connections, e.g., "a" and "b", to the processor array. The connection "a" may have more traffic to the input/output device 1, and the connection "b" may have more traffic from the input/output device 1. By connecting the connection "b" to the top row could result in more network congestion (adding to the traffic from the I/O device 0 to the processor cores). Thus, in this example, it is better to connect the connection "a" to the top row and "b" to the second row.

In general, to avoid network congestion, it is better to spread out the large amounts of traffic so the traffic travel through parallel paths. For read operations, if a memory controller having multiple I/O ports is connected to a top (or bottom) row of a processor array, such that several processor cores in a row may receive data in parallel, then it is preferable to route the data packets in the column direction first so that data packets travel in parallel through a wider path.

For read operations, if a memory controller having multiple I/O ports is connected to a left (or right) column of a processor array, such that several processor cores in a column may receive data in parallel, then it is preferable to route the data packets in the row direction first so that data packets travel in parallel through a wider path.

For write operations, if a memory controller having multiple I/O ports is connected to a top (or bottom) row of a processor array, then it is preferable to route the data packets in the row direction first, then route the data packets to the multiple I/O ports in the column direction in parallel.

For write operations, if a memory controller having multiple I/O ports is connected to a left (or right) column of a processor array, such that several processor cores in a column may receive data in parallel, then it is preferable to route the data packets in the column direction first, then route the data packets to the multiple I/O ports in the row direction in parallel.

In some implementations, the routing of packets can be pre-configured, such that a first type of data or instructions are routed according to a first predefined dimension ordering, and a second type of data or instructions are routed according to a second predefined dimension ordering, etc. For example, read data can be routed according to a first ordering of dimensions, and write data can be routed according to a second ordering of dimensions. In this example, even though the ordering of dimensions for a specific type of data is fixed, network congestion can still be reduced by using different orderings of dimensions for different types of data.

In some implementations, the routing of packets can be dynamically configured by software at run time, e.g., by an operating system, hypervisor, or application software. For example, a first software application may require reading large amounts of data from and writing large amounts of data to the memory frequently, but the reading and writing occur at different times. In this case, assuming the memory controller is connected to the top row of the processor array as shown in FIG. 1, the first software application may configure the mesh network to route write data in the X-dimension first followed by the Y-dimension, and route read data in the Y-dimension first followed by the X-dimension in order to reduce the skin effect.

In the example above, a second software application may require reading large amounts of data from the memory while at the same time writing small amounts of data to the memory. In this case, the second software application may configure the mesh network to route read data in the Y-dimension first followed by the X-dimension, and route write data in the Y-dimension first followed by the X-dimension to avoid congestion in the Y-dimension. In the above examples, the first and second software applications route the read data in a similar manner but route the write data differently.

Stacked Dimension Ordered Routing

One or more intermediate points can be introduced to route a packet between the source and destination.

Figure 9:
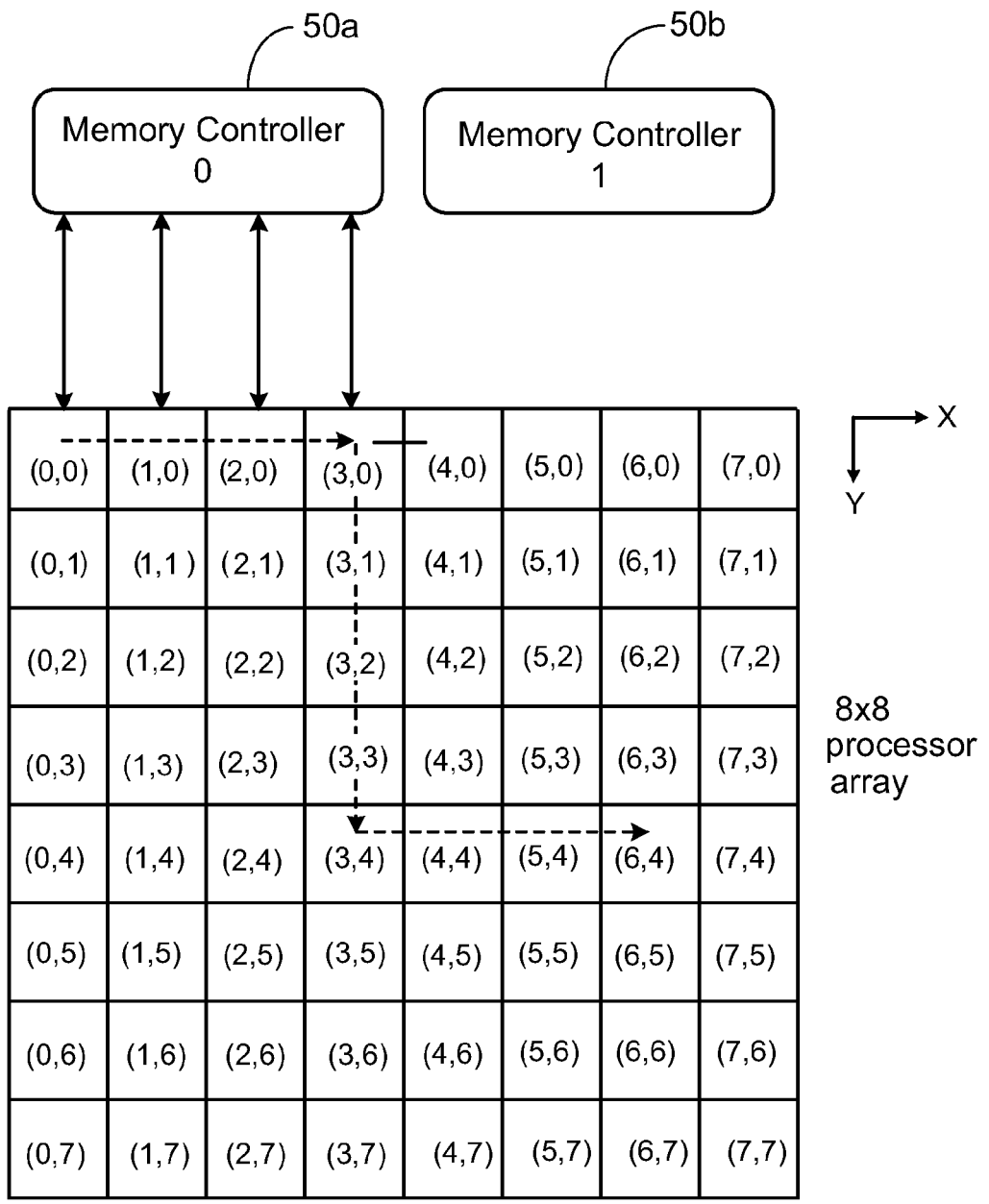
FIG. 9 is a diagram showing routing data through an intermediate processor.

Referring to FIG. 9, for example, a packet comes from memory controller 0 (50a) and goes to core(6,4). Assume X-first routing is used. In order to avoid the congestion between core(3,0) and core(4,0) as shown in FIG. 1, a packet can be first routed to an intermediate point, e.g., core(3,4), using the dimension ordered routing. Because core(3,4) is not the final destination, a bit in the packet header can be used to indicate that additional header is to be looked up in order to route the packet to the final destination.

In some implementations, the sender (e.g., a processor core or an input/output device) has most of the intelligence. The sender adds to the packet header a bit to indicate that an additional header is to be looked up. The sender adds the additional headers. After a packet reaches an intermediate point, the current header is popped out and the additional header becomes the header for the remainder of the route.

If there are more than one intermediate point, the sender can add two or more bits to the header to indicate that two or more additional headers are to be looked up during the routing process. When a packet reaches the first intermediate point, the first header is popped out and the second header becomes the header for the second segment of the route. When the packet reaches the second intermediate point, the second header is popped out and the third header becomes the header for the third segment of route, and so forth. Software can program a mapping table to select the intermediate points. For example, the mapping table may specify that for destination (x0,y0), use intermediate point (xi0, yi0).

In some implementations, the intelligence about how to route packets is distributed, and one packet header is used for each route hop. The packet header has data about the source node, intermediate point, and destination node of each hop, which can be used to determine the route for the hop. The sender does not assemble the full route ahead of time, rather, it is up to the intermediate point to update the packet header.

For each node along the route, if the current node matches the intermediate node in the header, and the intermediate node is the same as the destination node in the header, then the final destination is reached. If the current node matches the intermediate node in the header, and the intermediate node is not the same as the destination node, then the current node will update the intermediate node in the header to be the next intermediate point. If the current node does not match the intermediate node in the packet header, then the current node does not modify the packet header.

For two-dimensional routing, to update the next intermediate node, the current intermediate point copies the destination node to the next intermediate node. For example, if an intermediate node receives a header with coordinates [source, intermediate, destination]=[(x0,y0), (x1, y1), (x2,y2)], the intermediate node changes the coordinates of the next source and intermediate nodes to (x1,y1) and (x2,y2), respectively. The destination node can be (x2,y2) or some other node.

For n-dimensional routing, the intermediate point copies the next dimension of the destination node to the next intermediate node. For example, assume that Z first, Y second, and X third dimension ordering is used, and suppose the initial intermediate node is (xi0, yi0, zi0) and the destination node is (x1, y1, z1). In the next hop, the source node becomes (xi0, yi0, zi0), the intermediate node becomes (xi0, yi0, z1) (which is obtained by copying the z-dimension of the destination node), and the destination node remains (x1, y1, z1). In the next hop, the source node becomes (xi0, yi0, z1), the intermediate node becomes (xi0, y1, z1) (which is obtained by copying the y-dimension of the destination node), and the destination node remains (x1, y1, z1). In the next hop, the source node becomes (xi0, y1, z1), the intermediate node becomes (x1, y1, z1) (which is obtained by copying the x-dimension of the destination node), and the destination node remains (x1, y1, z1).

As an example, in FIG. 9, a packet comes from memory controller 0 (50a) and goes to core(6,4). The memory controller 0 first specifies that the intermediate destination is (3,4), in which the Y-dimension is satisfied, and the final destination is (6,4). Once core(3,4) receives the packet, it updates the packet header so that the intermediate destination is (6,4) and the final destination is (6,4).

Using the intermediate point approach described above can avoid network congestion and provide fault tolerance—the routing scheme works even if a certain link is down. Using the intermediate point approach can also solve the skin effect problem by using the operating system or hypervisor to choose the intermediate point in a way that avoids the skin effect for a particular set of memory controllers or input/output devices. One of the benefits is this approach is flexibility, in which the operating system or hypervisor can choose the intermediate points based on specific application needs.

One implementation is to select intermediate points so that it has the same X or Y coordinate as the source or destination. For example, given the pair of source (x1, y1) and destination (x2, y2), the intermediate point can be (x1, y2) assuming X-first routing, and the intermediate point can be (x2, y1) assuming Y-first routing.

Using the routing scheme described above, up to 8 routing resources in the X dimension can be utilized to route packets to avoid the skin effect, instead of the originally one routing resource in the X dimension, i.e., between core(3,0) and core(4,0).

In some implementations, the routing of packets through an intermediate point can be pre-configured. For example, for a first type of data or instructions are routed from input/output devices to intermediate points according to a first predefined dimension ordering, then routed from the intermediate points to the processor cores according to a second predefined dimension ordering. A second type of data or instructions are routed from the processor cores to intermediate points according to a third predefined dimension ordering, then routed from the intermediate points to the input/output devices according to a fourth predefined dimension ordering, etc.

The first, second, third, and fourth predefined dimension ordering do not necessarily have to be all different. For example, the first and second dimension orderings can be the same, and the third and fourth dimension orderings can be the same.

In some examples, read data can be routed from memory controllers to intermediate points according to a first ordering of dimensions (Y-dimension first, X-dimension second), then from the intermediate points to the processor cores according to a second ordering of dimensions (Y-dimension first, X-dimension second), and write data can be routed from the processor cores to intermediate points according to a third ordering of dimensions (X-dimension first, Y-dimension second), then routed from the intermediate points to the memory controllers according to the fourth ordering of dimensions (X-dimension first, Y-dimension second), etc. In this example, even though the ordering of dimensions for a specific type of data is fixed, network congestion can still be reduced by using different orderings of dimensions for different types of data when routing through intermediate points.

When there are more than one intermediate point, the orderings of dimensions for a specific type of data from the source to the first intermediate point, from the first intermediate point to the second intermediate point, ..., from the last intermediate point to the destination can be preconfigured, in which the orderings of dimensions are different for different types of data.

The examples described above can have one or more of the following advantages.

The skin effect caused by the input/output device can be resolved by the input/output extension network 22. The hot spots, e.g., between core(0,3) and core(0,4), can be removed.

The traffic loadings on the on-chip mesh networks are more evenly distributed. Network congestions are reduced. As a result, the on-chip mesh network latency is more deterministic.

There is less latency to go to an input/output device on the opposite side of the chip by going through the low latency extension network in the I/O area.

Memory affinity restriction can be reduced or removed to simplify software development.

Without restrictions of memory affinity, memory allocation can be based on other considerations. For example, memory space with random memory access can be allocated to a memory controller that uses a closed page policy. Memory space with some temporal/spatial locality can be allocated to another memory controller that uses an open page policy.

Tiled Architecture

The following describes an example tiled architecture that can be used to implement the processor array 10 of FIG. 1.

Figure 10:
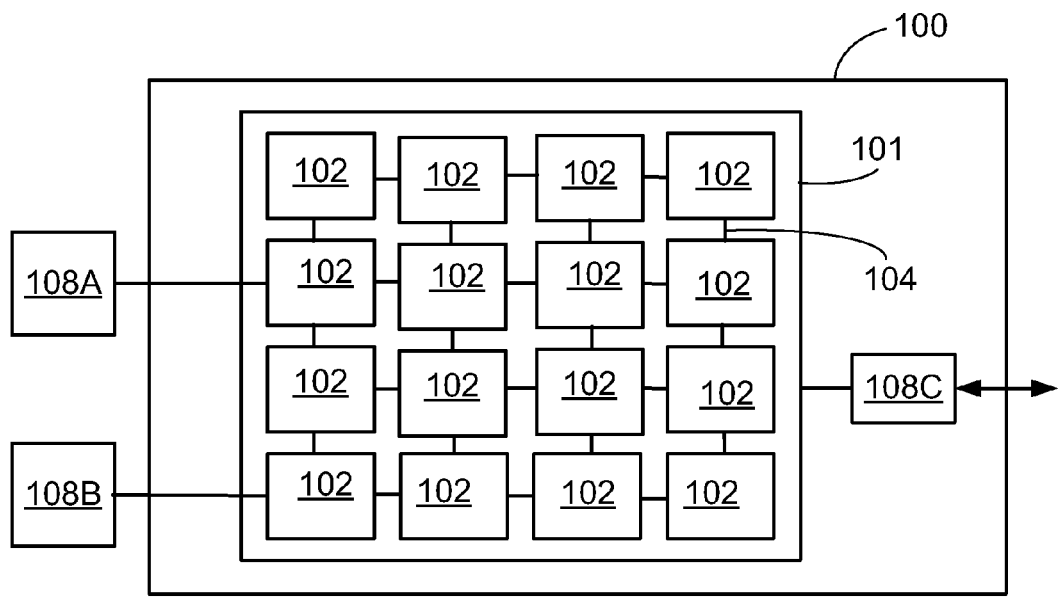
FIG. 10 is a block diagram of a tiled integrated circuit.

Referring to FIG. 10, an integrated circuit 100 (or "chip") includes an array 101 of interconnected tiles 102 (which can correspond to the processor array 10 of FIG. 1). Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles over the communication fabric formed by the switches and data paths. The integrated circuit 100 includes other on-chip circuitry such as input/output (I/O) interface circuitry to couple data in and out of the circuit 100, and clock distribution circuitry to provide clock signals to the processors of the tiles. The tiled architecture is described in more detail in U.S. patent application Ser. No. 11/404,958.

The data path 104 between any two tiles can include multiple "wires" (e.g., serial, parallel or fixed serial and parallel signal paths on the IC 100) to support parallel channels in each direction. Optionally, specific subsets of wires between the tiles can be dedicated to different mesh networks that can operate independently.

In some examples, the network includes paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 11:
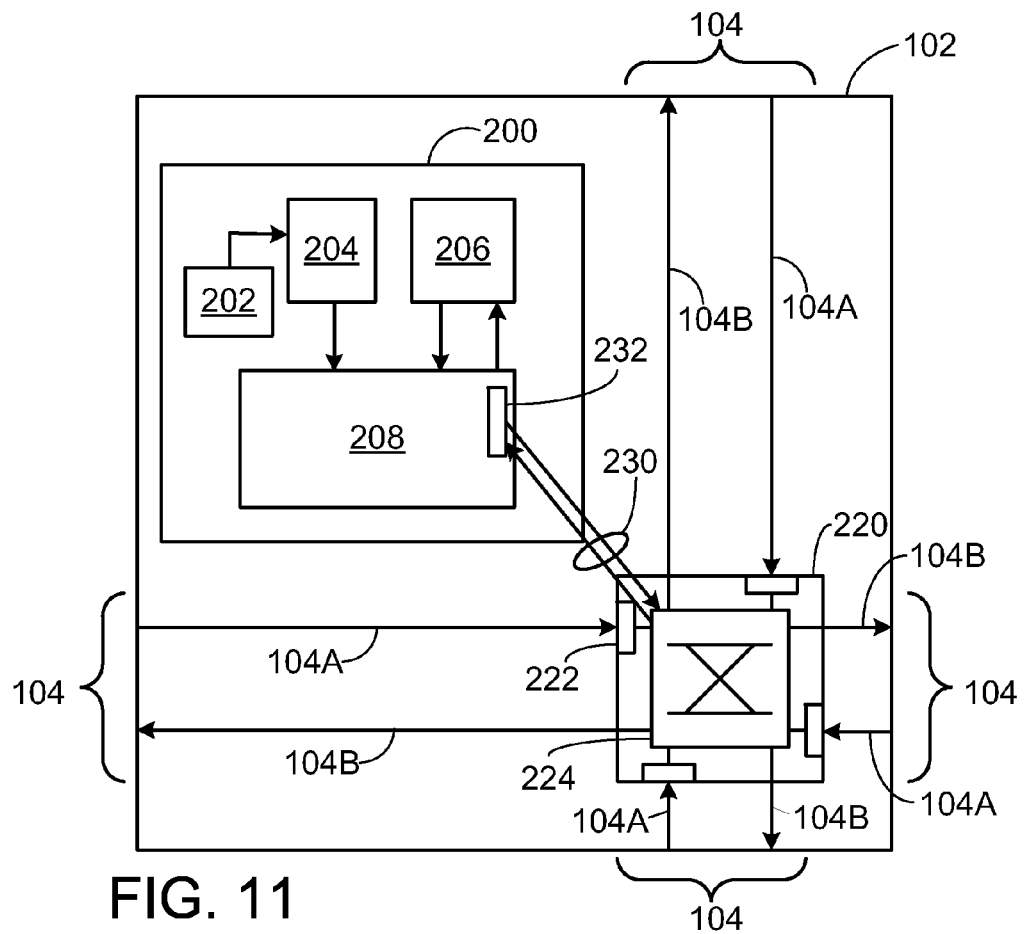
FIG. 11 is a block diagram of a tile.

Referring to FIG. 11, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit.

The processor 200 can be multithreaded and/or have capabilities of a Very Long Instruction Word (VLIW) processor, a superscalar processor, or a vector processor. A VLIW processor can issue multiple instructions based on a stream of macro instructions including subinstructions designated to be executed concurrently by a compiler. A superscalar processor can issue multiple instructions by partitioning one or more instruction stream at run time to multiple functional units. A vector processor can execute instructions using multiple functional units to operate on respective components of data. A multithreaded processor can execute multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on the a network port. In some examples, the processor 200 is a fine grain multithreaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

Switch Operation

Continuing to refer to FIG. 11, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (for example, in header information). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 12:
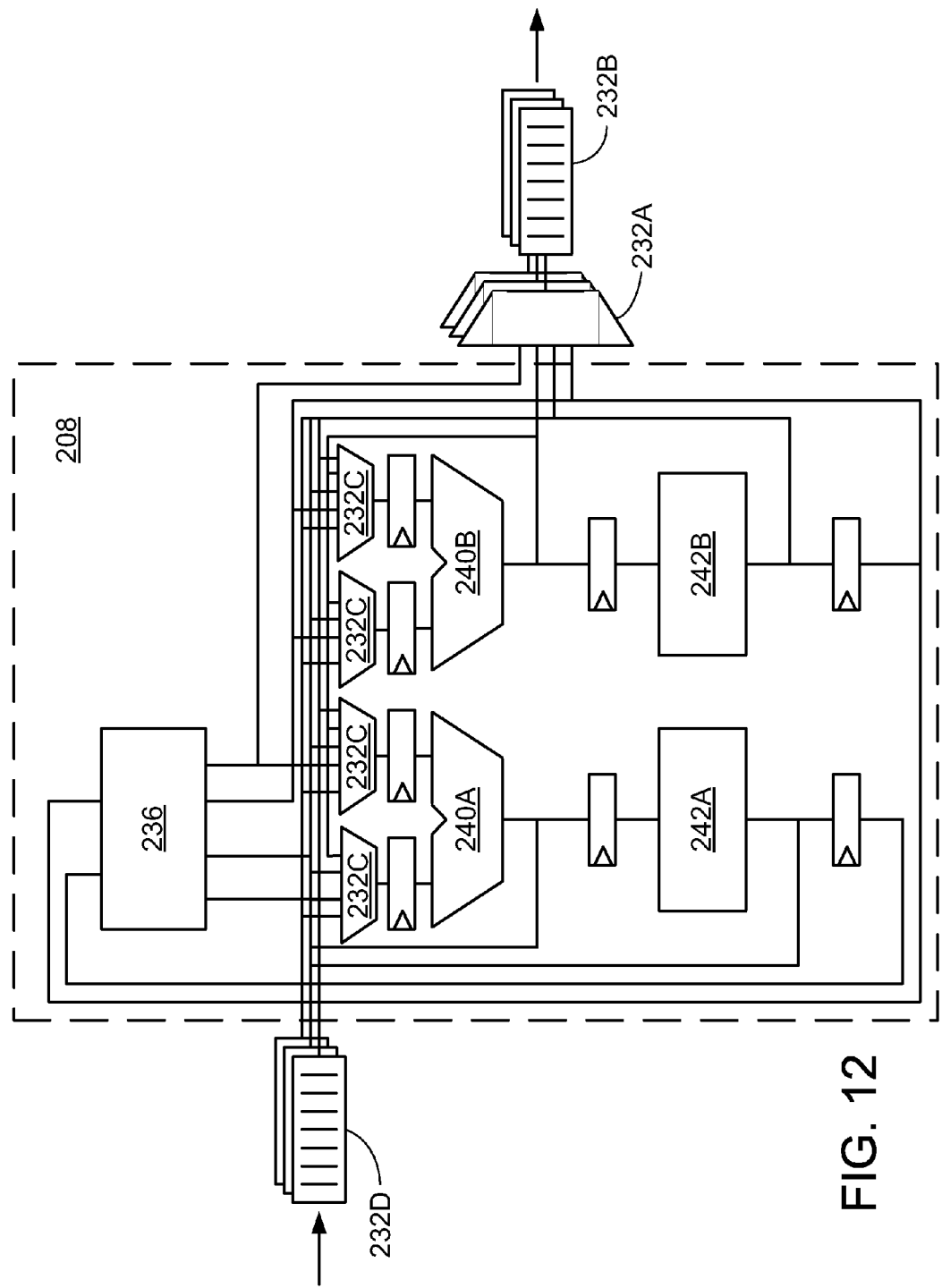
FIG. 12 is a block diagram of a pipeline.

Referring to FIG. 12, a register mapped pipeline integrated switch interface 232 (FIG. 11) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (see FIG. 11) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 13:
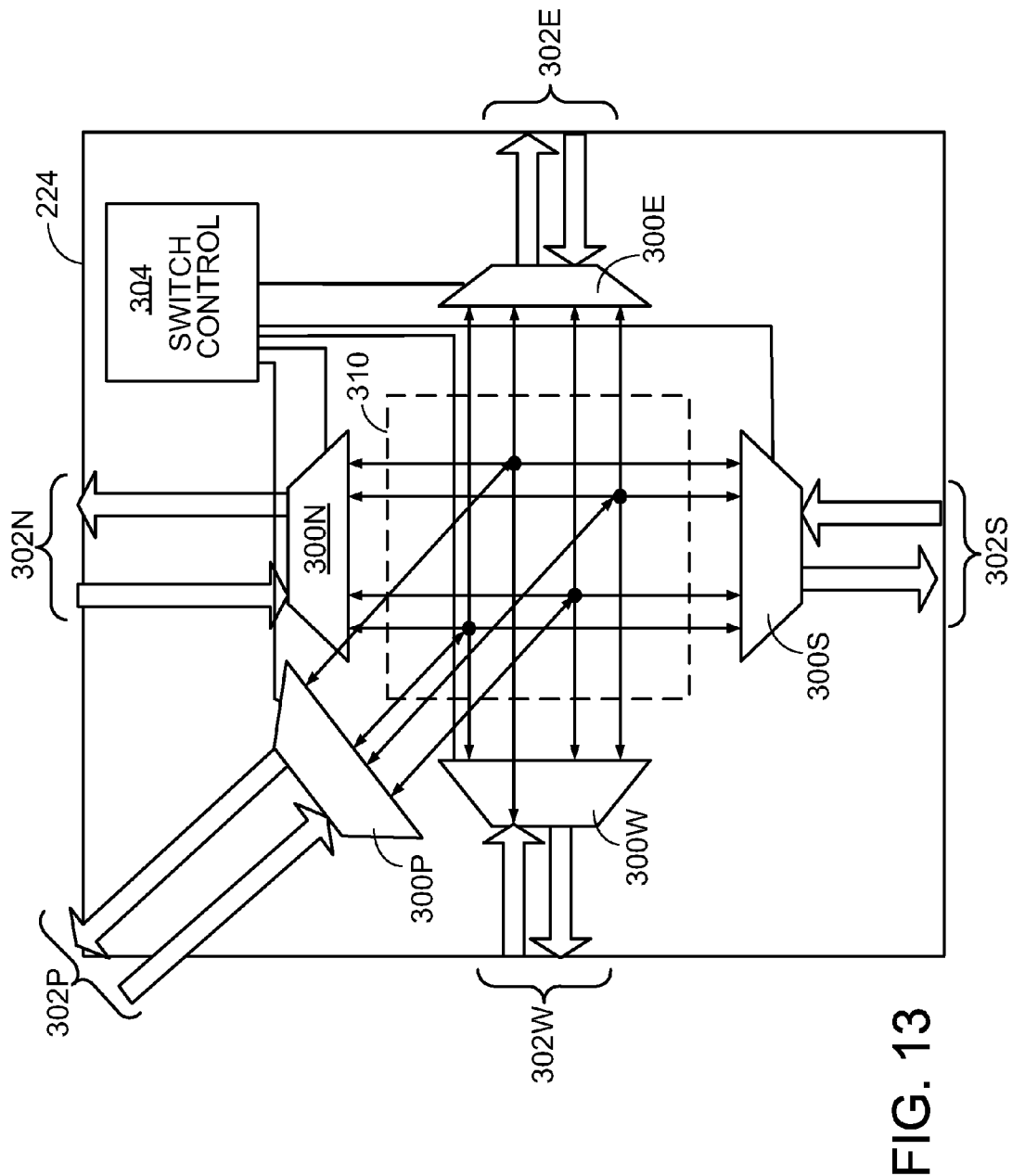
FIGS. 13 and 14 are block diagrams of switching circuitry.

Referring to FIG. 13, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 14:
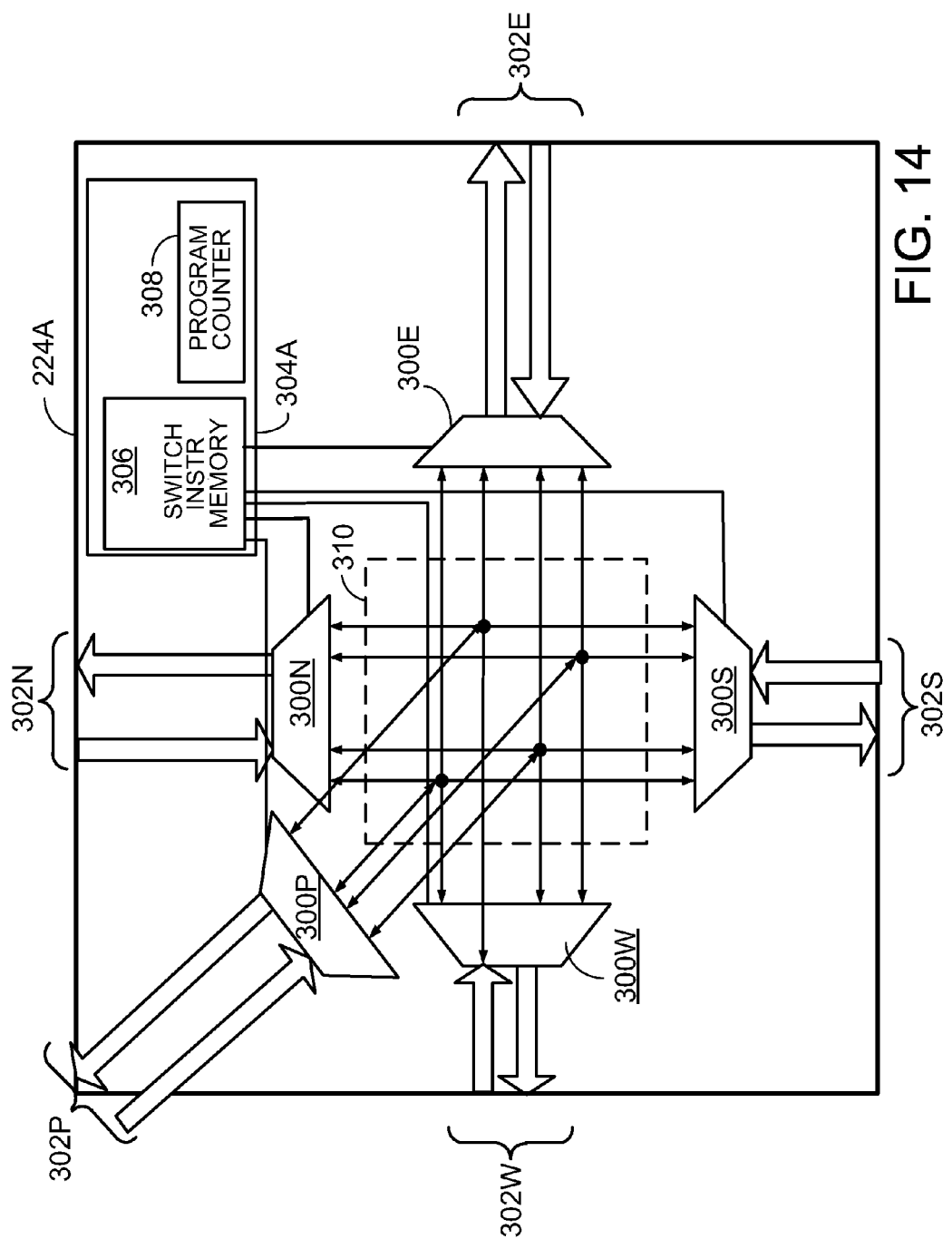

Referring to FIG. 14, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples, the switch control module 304A can be a VLIW-type processor and can be multithreaded.

Fast access to the on-chip interconnect in a multicore chip or tiled architecture is a key property for good performance. Some processors access input/output (I/O) mechanisms to communicate with other processors as a result of bus transactions and memory operations. Other processors can use techniques to communicate at faster speeds (at register speeds, for example, being able to access a network port in 1 or 2 cycles, and thereby to communicate a value from one core to another core in 1 to 5 cycles, for example). Such fast access is helpful for distributed ILP (instruction level parallelism) compilation. It is also helpful for efficient stream interfacing. Some processors do not have good ways of accessing the interconnect directly. Fast access to the network can be provided by techniques used in the processor microarchitecture and in its instruction set.

It is to be understood that the foregoing description is intended to illustrate and not to limit the scope of the invention, which is defined by the scope of the appended claims. Other embodiments are within the scope of the following claims. For example, the skin effect can be addressed using the following approaches: (a) Make a fat connection around the periphery of the mesh network (e.g., outer ring has a fat connection), or (b) use fat connections for the entire mesh network.

What is claimed is:

1. An apparatus, comprising:
 a multicore processor comprising a plurality of processor tiles, each processor tile comprising a processor core, the multicore processor having edge processor tiles;
 an interconnection mesh network having input/output ports that interconnect the plurality of processor tiles and enable transfer of data among the processor cores, with each of the input/output ports of the interconnection mesh network associated with one of the processor tiles such that the associated input/output port of the interconnection mesh network sends input data to the associated processor tile and receives output data from the associated processor tile, with the interconnection mesh network having data paths that connect peripheral ones of the plurality of processor tiles; and
a configurable, extension network that comprises a plurality of network links added between each of a plurality of peripheral devices and the interconnection mesh network, with the plurality of network links coupled between the plurality of peripheral devices and the interconnection mesh network, according to a mapping scheme, the network links added between the interconnection network at edge ones of the processor tiles and respective ones of the plurality of peripheral devices according to the mapping scheme to connect via the mapping input/output ports of the interconnection mesh network to input/output ports of the plurality of peripheral devices to off load to the extension network data transfers between edge processor cores and input/output ports of one or more of the peripheral devices from the interconnection mesh network.

2. The apparatus of claim 1 further comprising:
a storage device that stores the mapping scheme that comprises a mapping between a source node, a destination node with a route defined for traffic between the source and destination nodes; and
wherein the mapping between input/output ports of the interconnection network and input/output ports of the one or more peripheral devices is configurable by software table look-up operations.

3. The apparatus of claim 1, comprising network switches to enable several peripheral devices to be connected through the extension network.

4. The apparatus of claim 1 in which the peripheral devices comprise a memory controller.

5. The apparatus of claim 1 in which the interconnection network comprises N dimensions, N being an integer.

6. The apparatus of claim 1 in which the interconnection network comprises a mesh network.

7. The apparatus of claim 1 wherein the configurable, extension network that comprises the network links has the network links added by one or more of the processor cores.

8. The apparatus of claim 1 further comprising;
plural memory controllers as at least some of the peripheral devices, with the configurable, extension network receiving traffic from the mesh network interconnecting the processor cores and off-loading the traffic from a peripheral one of rows of the mesh network to the extension network to access the memory controllers.

9. The apparatus of claim 8 wherein the extension network provides similar distances between each processor core and the memory controllers.

10. The apparatus of claim 8 wherein the extension network minimizes a skin effect between the processor cores and the memory controllers.

11. An apparatus, comprising:
a multicore processor comprising a plurality of processor cores, the multicore processor having edge processor tiles;
an interconnection mesh network having input/output ports that interconnect the plurality of processor tiles and enable transfer of data among the processor cores, with each of the input/output ports of the interconnection mesh network associated with one of the processor cores such that the associated input/output port of the interconnection mesh network sends input data to the associated processor core and receives output data from the associated processor core, with the interconnection mesh network having data paths that connect peripheral ones of the plurality of processor tiles; and
a configurable extension network comprises a plurality of network links added between each of a plurality of peripheral devices and the interconnection mesh network, with the plurality of network links coupled between the plurality of peripheral devices and the interconnection mesh network, according to a mapping scheme stored in a table, the network links added between the interconnection network at edge ones of the processor tiles and of the plurality of peripheral devices according to the mapping scheme to connect via the mapping input/output ports of the interconnection mesh network to input/output ports of the plurality of peripheral devices to off load data to the extension network transfers between processor cores and input/output ports of one or more of the peripheral devices at the edge processor tiles to minimize skin effects on the interconnection network.

12. A method comprises:
routing data through an interconnection mesh network that having input/output ports that interconnects a plurality of processor tiles, each processor tile comprising a processor core, to enable transfer of data among the processor cores, with each of the input/output port of the interconnection mesh network associated with one of the processor tiles such that the associated input/output port of the interconnection mesh network sends input data to the associated processor tile and receives output data from the associated processor tile; and at an edge of the interconnection mesh network, with the interconnection mesh network having data paths that connect peripheral ones of the plurality of processor tiles;
configuring an extension network that comprises a plurality of network links that are added between each of a plurality of peripheral devices and the interconnection mesh network, at edge ones of the processor tiles to connect input/output ports of the interconnection mesh network to input/output ports of the plurality of peripheral devices;
mapping network links according to a mapping scheme that is stored in a mapping table:
configuring the added links to provide connections via the mapping between input/output ports of the peripheral devices and input/output ports of the interconnection mesh network to off load data transfers to the extension network between processor cores and one or more of the peripheral devices from an edge path of the interconnection network to the extension network to minimize skin effects on the interconnection network.

13. The method of claim 12 in which mapping between input/output ports of the interconnection network and input/output ports of the one or more peripheral devices is configurable by software table look-up operations.

14. The method of claim 12, further comprising configuring network switches to enable several peripheral devices to be connected through the extension network.

15. The method of claim 12 wherein the peripheral devices comprise a memory controller.

16. The method of claim 12 wherein the interconnection network comprises N dimensions, N being an integer.

17. The method of claim 12 wherein the interconnection network comprises a mesh network.

18. The apparatus of claim 12 wherein the extension network that comprises the added network links has the added network links added by one or more of the processor cores.

19. The apparatus of claim 18 further comprising;
plural memory controllers as at least some of the peripheral devices, with the configurable, extension network configured to receive traffic from the mesh network interconnecting the processor cores and to off load the traffic from a peripheral one of rows of the mesh network to the extension network to access the memory controllers.

20. The apparatus of claim 18 wherein the extension network provides similar distances between each processor core and the memory controllers.

* * * * *